US006235828B1

(12) United States Patent
Fujikake et al.

(10) Patent No.: US 6,235,828 B1
(45) Date of Patent: May 22, 2001

(54) AQUEOUS POLYMERIZATION OF ACRYLAMIDE IN THE PRESENCE OF POLYVINYLPYRROLIDONE

(75) Inventors: Masato Fujikake; Shigeki Hamamoto; Nobutaka Fujimoto; Kimihiko Kondo; Morio Nakamura, all of Himeji; Takao Okada, Kakogawa, all of (JP)

(73) Assignees: Sumitomo Seika Chemicals Co., Ltd.; Taki Chemical Co., Ltd., both of Hyogo (JP)

( * ) Notice: Subject to any disclaimer, the term of this patent is extended or adjusted under 35 U.S.C. 154(b) by 0 days.

(21) Appl. No.: 09/341,475

(22) PCT Filed: Jan. 9, 1998

(86) PCT No.: PCT/JP98/00039

§ 371 Date: Aug. 31, 1999

§ 102(e) Date: Aug. 31, 1999

(87) PCT Pub. No.: WO98/30600

PCT Pub. Date: Jul. 16, 1998

(30) Foreign Application Priority Data

Jan. 10, 1997 (JP) ..................................................... 9-014670

(51) Int. Cl.[7] ........................ C08F 120/56; C08F 220/56; C08F 220/06; C08K 3/24; C08L 39/08

(52) U.S. Cl. ....................... 524/458; 524/555; 526/303.1; 526/303.6; 526/201

(58) Field of Search ................................ 526/201, 303.1, 526/307.6; 524/458, 555

(56) References Cited

U.S. PATENT DOCUMENTS 3,468,832 * 9/1969 Barabas et al. ..................... 260/29.6
4,282,340 * 8/1981 Anchor et al. ......................... 526/93

FOREIGN PATENT DOCUMENTS 0 115 436 A2 8/1984 (EP) .
4132705 * 5/1992 (JP) ................................. C08F/2/44
4279604 * 10/1992 (JP) ................................. C08F/2/20

OTHER PUBLICATIONS

Chemical Abstracts, vol. 118, No. 6, Feb. 8, 1993, Abstract No. 40072 and JP 04–132705, May 7, 1992, abstract.

* cited by examiner

*Primary Examiner*—David W. Wu
*Assistant Examiner*—Kelechi C. Egwim
(74) *Attorney, Agent, or Firm*—Connolly Bove Lodge & Hutz, LLP

(57) ABSTRACT

A method for producing a highly concentrated aqueous acrylic amide-based polymer dispersion which is inexpensive, good in fluidity and easy to handle is provided. The method comprises polymerizing a water-soluble monomer composition containing an acrylic amide monomer in an aqueous solution of an inorganic salt in the presence of a homopolymer of vinylpyrrolidone and/or a copolymer of vinylpyrrolidone and other monomer(s).

10 Claims, No Drawings

AQUEOUS POLYMERIZATION OF ACRYLAMIDE IN THE PRESENCE OF POLYVINYLPYRROLIDONE

TECHNICAL FIELD

The present invention relates to a novel method of producing an acrylic amide-based polymer dispersion. More particularly, it relates to a novel method of producing an aqueous dispersion of a water-soluble acrylic amide-based polymer, which is in wide use as flocculants or dehydrating agents for waste water treatment, additives or agents for use in paper manufacturing, dispersion stabilizers for suspensions, soil conditioners and so on.

PRIOR ART

An acrylic amide-based polymer dispersion has so far been manufactured by dispersing a water-soluble polyacrylamide in aqueous inorganic salt solution (e.g. JP-A 2-99574) or by polymerization, mostly in aqueous solution, of an acrylic amide monomer. In the process comprising polymerization in aqueous solution, increase in monomer concentration will result in formation of a gel-like matter due to water absorption by the polymer, making it very difficult to handle the polymer in the step of dissolution, for instance. Therefore, the polymer is diluted and supplied In the form of low-concentration solution, which is fluid, or it is used in the pulverized form obtained by drying. However, handling them at low concentrations uneconomically involves increased transporting expenses, while to obtain the pulverized form by drying requires an enormous quantity of heat energy for drying and, in addition, may produce such a problem as thermal three-dimensional crosslinking upon heating, which leads to insolubilization of the polymer.

A method is also known for producing an acrylic amide-based polymer which comprises water-in-oil type emulsion polymerization, or suspension polymerization in a hydrophobic solvent (e.g. JP-A 5-194613). However, the resulting organic solvent-containing product needs a device and measure in relation to the use of an inflammable solvent. Furthermore, from the production viewpoint as well, the inflammability and strong odors, among others, of organic solvents involve a huge cost in an equipment such as the polymerization apparatus so as to cope with possible working environment problems.

The organic solvent-free production process which comprises precipitation polymerization in an aqueous salt solution is worthy of attention and involves a low cost of equipment. However, such mode of polymerization has a drawback in that the resulting polymer particles tend to aggregate into large lumps, which are very difficult to handle.

Another method of precipitation polymerization is further known which comprises carrying out the polymerization in an aqueous salt solution, which contains a small amount of a polyhydric alcohol such as glycerol or a polyelectrolyte, such as sodium polyacrylate, added as a protective colloid (e.g. JP-B 4-39481 and JP-B 6-72170). This method can indeed prevent mutual adhesion of precipitated polymer particles to a certain extent but the concentration of the raw material water-soluble monomer or monomers has to be reduced. It is further necessary to hold down the degree of anionization or cationization in terms of the solubility in the aqueous salt solution.

SUMMARY OF THE INVENTION

In view of the current situation mentioned above, the object of the present invention is to provide a method of producing a highly concentrated aqueous dispersion of acrylic amide-based polymer which is inexpensive, good in fluidity and easy to handle.

As a result of their intensive investigations in an attempt to solve the above problems, the present inventors has accomplished the invention by finding that a highly concentrated aqueous dispersion of acrylic amide-based polymer which is inexpensive, good in fluidity and easy to handle can be produced when a water-soluble monomer composition containing an acrylic amide monomer is subjected to polymerization in an aqueous solution of an inorganic salt in the presence of a polymer comprising a vinylpyrrolidone as an essential component. Thus, the present invention relates to a method of producing an acrylic amide-based polymer dispersion which comprises polymerizing a water-soluble monomer composition containing an acrylic amide monomer in an aqueous solution of an inorganic salt in the presence of a homopolymer of vinylpyrrolidone and/or a copolymer of vinylpyrrolidone and other monomer(s), while allowing precipitation of fine polymer particles.

DETAILED DESCRIPTION OF THE INVENTION

In the following, the present invention is described in detail.

As the water-soluble monomer composition containing an acrylic amide monomer, which is used in the present invention, there may be mentioned, among others, acrylamide, methacrylamide (hereinafter, these two compounds are collectively referred to as (meth)acrylamide for short), a mixture of (meth)acrylamide and an anionic monomer copolymerizable therewith, and a mixture of (meth) acrylamide and an cationic monomer copolymerizable therewith.

Said anionic monomer includes, among others, alkali metal salts, alkaline earth metal salts and ammonium salts of (meth)acrylic acid, 2-acrylamido-2-methylpropanesulfonic acid, fumaric acid, crotonic acid, maleic acid and styrenesulfonic acid, and mixtures thereof. Among these, alkali metal salts of (meth)acrylic acid and alkaline earth metal salts of (meth)acrylic acid are preferred.

As said alkali metal salts of (meth)acrylic acid and alkaline earth metal salts of (meth)acrylic acid, there may be mentioned, for example, lithium (meth)acrylate, sodium (meth)acrylate, potassium (meth)acrylate, magnesium (meth)acrylate, calcium (meth)acrylate, etc. Among these, sodium acrylate is readily available and economical, hence most preferred.

The cationic monomer mentioned above includes, among others, (meth)acrylamidoethyltrimethylammonium chloride, (meth)acrylamidopropyltrimethylammonium chloride and the like.

In cases where a mixture of (meth)acrylamide and an anionic monomer or a cationic monomer is used as the water-soluble monomer composition containing an acrylic amide monomer, the content of the anionic monomer or cationic monomer is preferably not more than 40 mole percent based on the whole amount of said water-soluble monomer composition containing an acrylic amide monomer. A content exceeding 40 mole percent is unfavorable since the polymer formed is dissolved in the aqueous inorganic salt solution.

Said water-soluble monomer composition containing an acrylic amide monomer, preferably accounts for 1 to 70% by weight based on the sum total of the inorganic salt, the homopolymer of vinyl pyrrolidone and/or the copolymer of vinylpyrrolidone and other monomer(s), and the water-soluble monomer composition containing an acrylic amide monomer, which are to be used in the production method of the present invention. A proportion below 1% by weight will be economically disadvantageous and, at a proportion exceeding 70% by weight, the viscosity will increase within the system, making operation difficult.

The inorganic salt to be used in the present invention includes ammonium salts of inorganic acid such as ammonium sulfate, ammonium nitrate, ammonium hydrogen sulfate, diammonium hydrogen phosphate, etc.; alkali metal salts and alkaline earth metal salts of inorganic acid such as potassium sulfate, sodium sulfate, magnesium sulfate, potassium nitrate, sodium nitrate, potassium chloride, sodium chloride, calcium chloride, dipotassium hydrogen phosphate, sodium dihydrogen phosphate, and aluminum sulfate, aluminum chloride and the like.

These can be used alone or in the form of an adequate mixture. Ammonium salts of inorganic acid and sodium salts of inorganic acid are preferred among others, and ammonium sulfate and sodium sulfate are more preferred. Other salts than these, if aqueous solutions thereof do not dissolve the product polymer, also fall within the scope of the present invention.

The concentration of said aqueous inorganic salt solution is not particularly restricted but it is preferred that a state of saturation be always kept even during the polymerization reaction so that the resulting polymer can precipitate with ease.

The homopolymer of vinylpyrrolidone and/or copolymer of vinylpyrrolidone and other monomer(s), which is used in the present invention, is not particularly restricted but includes, among others, polyvinylpyrrolidone; vinylpyrrolidone/vinyl acetate copolymers; vinylpyrrolidone/vinyl alcohol copolymers; vinylpyrrolidone/styrene copolymers; vinylpyrrolidone/long chain α-olefin copolymers such as vinylpyrrolidone/hexadecene copolymers and vinylpyrrolidone/eicosene copolymers, etc.; vinylpyrrolidone/stearyl (meth)acrylate copolymers; vinylpyrrolidone/dimethylaminoethyl (meth) acrylate copolymers and quaternization products thereof; vinylpyrrolidonel(meth) acrylamidopropyltrimethylammonium chlcoride copolymers; vinylpyrrolidone/vinylcaprolactam/dimethylaminoethyl (meth)acrylate ternary copolymers and quaternization products thereof; and the like. Among these, polyvinylpyrrolidone and vinylpyrrolidone/vinyl acetate copolymers are preferred, since the use thereof leads to production of acrylic amide-based polymers excellent in dispersibility in water.

The molecular weight of the homopolymer of vinylpyrrolidone and/or copolymer of vinylpyrrolidone and other monomer(s), which is used in the present invention, is not particularly restricted but, depending on its type, the polymerization conditions and other factors, it is generally not more than 2,000,000, preferably not more than 500,000, more preferably not more than 100,000.

The addition amount of the homopolymer of vinylpyrrolidone and/or copolymer of vinylpyrrolidone and other monomer(s), which is used in the present invention, may vary depending on its type, molecular weight and other factors, but it is preferably within the range of 0.1 to 100 parts by weight, more preferably 5 to 20 parts by weight, per 100 parts by weight of the water-soluble monomer composition containing an acrylic amide monomer. An amount below 0.1 part by weight, at which no dispersion stabilizing effect will be produced and the product occurs as lumps, is comparable with the case of no addition. At an amount exceeding 100 parts by weight, the aggregation activity of the acrylic amide-based polymers cannot be expected any longer.

The method of the present invention for producing (meth) acrylamide-based polymer dispersions is now described. Thus, a reaction vessel equipped with a stirrer, a thermometer, a nitrogen inlet tube and a condenser is charged with the selected water-soluble monomer composition containing an acrylic amide monomer, and the aqueous salt solution containing the homopolymer of vinylpyrrolidone or copolymer of vinylpyrrolidone and other monomer(s) as dissolved therein, and deoxygenated with nitrogen gas, a polymerization initiator is then added, and the polymerization is thereby caused to start with stirring. After initiation of the polymerization, fine product particles begin to precipitate and, in the state of completion of the polymerization reaction, a fluid dispersion of precipitated fine polymer particles can be obtained.

The method of the present invention for producing acrylic amide-based polymer dispersions can also be carried out by sequentially adding the selected water-soluble monomer composition containing an acrylic amide monomer, to the aqueous salt solution with the homopolymer of vinylpyrrolidone and/or copolymer of vinylpyrrolidone and other monomer(s) dissolved therein.

Said polymerization reaction starts upon warming to 0° C. to 100° C., preferably 20 to 60° C., by means of a warming bath, for instance. The polymerization time is 2 to 10 hours, although it may vary depending on the polymerization temperature.

The polymerization initiator mentioned above is not particularly restricted but includes, among others, peroxide polymerization initiators such as benzoyl peroxide, lauroyl peroxide, cumene hydroperoxide, tert-butyl hydroperoxide, potassium persulfate, etc.; azo-type polymerization 1initiators such as α,α'-azobisisobutyronitrile, 2,2'-azobis-2,4-dimethylvaleronitrile, dimethyl-2,2'-azobisisobutyrate, etc.: and redox system polymerization initiators such as ammonium ferrous sulfate/ammonium persulfate, ethanolamine/potassium persulfate, sodium bromate/sulfur dioxide, etc.

The addition amount of said polymerization initiator may vary depending on the type thereof and the reaction temperature, but it is generally used in an amount of 0.005 to 5% by weight relative to the water-soluble monomer composition containing acrylic amide monomer(s).

In carrying out the polymerization, a chain transfer agent such as isopropyl alcohol, an anionic surfactant such as dodecylbenzenesulfonate, a nonionic surfactant such as polyoxyethylenesorbitan monolaurate, etc. may be added as necessary.

The thus-obtained acrylic amide-based polymer generally has a viscosity average molecular weight of 5,000,000 to 10,000,000.

In accordance with the present invention, a highly concentrated aqueous acrylic amide-based polymer dispersion rich in dispersibility and fluidity can be obtained. The acrylic amide-based polymer obtained by the method of the present invention is supposed to occur in the form of a macromolecular complex resulting from an interaction between molecules thereof and molecules of the polymer comprising vinylpyrrolidone as an essential component thereof, although the mechanisms of interaction are uncertain. As a result of such interaction, fine polymer particles occurring in the aqueous salt solution as deposit or precipitate particles are rendered moderately three-dimensional, so that it becomes possible to prevent them from aggregate and thereby stabilize the dispersion.

By utilizing this interaction between macromolecules, it is possible to produce highly anionic or cationic acrylic amide-based polymers, so that an aqueous dispersion of an acrylic amide-based polymer with a wide range of degree of anionization or cationization can be obtained.

BEST MODES FOR CARRYING OUT THE INVENTION

The following examples illustrate the present invention in further detail. They are, however, by no means limitative of the scope of the present invention.

EXAMPLE 1

A 500-mL four-necked flask equipped with a stirrer, a nitrogen inlet tube, a thermometer and a reflux condenser was charged with 80.0 g of acrylamide, 4.0 g of polyvinylpyrrolidone (PVP) with a weight average molecular weight (Mw) of 10,000 and 199.0 g of pure water. After dissolution, there was obtained a homogeneous solution. To this solution was added 115.0 g of ammonium sulfate, and 2.0 g of sodium sulfate, and oxygen was removed from the reaction system by bubbling nitrogen gas while maintaining the temperature at 25° C. Then, 30 mg of potassium persulfate was added as a polymerization initiator, and the reaction was carried out with stirring at 25° C. for 8 hours. As a result, it was obtained an acrylamide polymer dispersion with fine acrylamide polymer particles uniformly dispersed therein. The viscosity of this dispersion was. 20,000 cps at 25° C. The acrylamide polymer produced was purified by precipitation in acetone, and the viscosity average molecular weight thereof was determined. It was about 9,000,000.

EXAMPLE 2

In the same manner as in Example 1, 52.3 g of acrylamide, 7.7 g of sodium acrylate and 4.0 g of PVP (Mw=10,000) were dissolved in 219.0 g of pure water. After addition of 115.0 g of ammonium sulfate and 2.0 g of sodium sulfate, oxygen was removed by bubbling nitrogen gas, 30 mg of potassium persulfate was added, and the polymerization was carried out with stirring at 25° C. for 8 hours. As a result, it was obtained an acrylamide polymer dispersion with fine acrylamide polymer particles uniformly dispersed therein with a degree of anionization of 10 mole percent. The viscosity of this dispersion was 500 cps at 25° C. and the viscosity average molecular weight of the product acrylamide polymer was about 8,000,000.

EXAMPLE 3

In the same manner as in Example 1, 52.3 g of acrylamide, 7.7 g of sodium acrylate and 6.0 g of a vinylpyrrolidone/vinyl acetate copolymer (70 mole %/30 mole %) were dissolved in 217.0 g of pure water. After addition of 115.0 g of ammonium sulfate and 2.0 g of sodium sulfate, oxygen was removed by bubbling nitrogen gas, 30 mg of potassium persulfate was added, and the polymerization was carried out with stirring at 25° C. for 8 hours, whereupon a dispersion of polymer with a degree of anionization of 10 mole percent was obtained. The viscosity of this dispersion was 2,200 cps at 25° C. and the viscosity average molecular weight of the product polymer was about 7,200,000.

EXAMPLE 4

In the same manner as in Example 1, 45.1 g of acrylamide, 14.9 g of sodium acrylate and 6.0 g of PVP (Mw=10,000) were dissolved in 255.2 g of pure water. After addition of 168.4 g of ammonium sulfate and 10.4 g of sodium sulfate, oxygen was removed by bubbling nitrogen gas, 30 mg of potassium persulfate was added, and the polymerization was carried out with stirring at 25° C. for 8 hours, whereupon a dispersion of polymer with a degree of anionization of 20 mole percent was obtained. The viscosity of this dispersion was 5,200 cps at 25° C. and the viscosity average molecular weight of the product polymer was about 6,500,000.

EXAMPLE 5

In the same manner as in Example 1, 45.1 g of acrylamide, 14.9 g of sodium acrylate and 8.0 g of PVP (Mw=20,000) were dissolved in 312.0 g of pure water. After addition of 207.3 g of ammonium sulfate and 12.7 g of sodium sulfate, oxygen was removed by bubbling nitrogen gas, 30 mg of potassium persulfate was added, and the polymerization was carried out with stirring at 25° C. for 8 hours, whereupon a dispersion of polymer with a degree of anionization of 20 mole percent was obtained. The viscosity of this dispersion was 8,400 cps at 25° C. and the viscosity average molecular weight of the product polymer was about 7,000,000.

EXAMPLE 6

In the same manner as in Example 1, 27.8 g of acrylamide, 12.2 g of sodium acrylate and 20.0 g of PVP (Mw=10,000) were dissolved in 200.6 g of pure water. After addition of 132.6 g of ammonium sulfate and 6.8 g of sodium sulfate, oxygen was removed by bubbling nitrogen gas, 30 mg of potassium persulfate was added, and the polymerization was carried out with stirring at 25° C. for 8 hours, whereupon a dispersion of polymer with a degree of anionization of 25 mole percent was obtained. The viscosity of this dispersion was 75,000 cps at 25° C. and the viscosity average molecular weight of the product polymer was about 6,100,000.

Comparative Example 1

The polymerization procedure of Example 2 was followed except that the use of PVP was omitted. Thus, 52.3 g of acrylamide and 7.7 g of sodium acrylate were dissolved in 219.0 g of pure water. After addition of 115.0 g of ammonium sulfate and 2.0 g of sodium sulfate, oxygen was removed by bubbling nitrogen gas, and 30 mg of potassium persulfate was added to thereby initiate the polymerization with stirring. With the progress of the polymerization, the viscosity of the reaction system increased until stirring became impossible and the reaction system became a lump.

Comparative Example 2

The polymerization procedure of Example 4 was followed except that the use of PVP was omitted. Thus, 45.1 g of acrylamide and 14.9 g of sodium acrylate were dissolved in 255.2 g of pure water. After addition of 168.4 g of ammonium sulfate and 10.4 g of sodium sulfate, oxygen was removed by bubbling nitrogen gas, and 30 mg of potassium persulfate was added to thereby initiate the polymerization with stirring. With the progress of the polymerization, the viscosity of the reaction system increased until stirring became impossible and the reaction system became a lump.

Comparative Example 3

The polymerization procedure of Example 4 was followed except that polyethylene glycol was used Instead of PVP. Thus, 45.1 g of acrylamide, 14.9 g of sodium acrylate and 6.0 g of polyethylene glycol (Mw=400) were dissolved in 255.2 g of pure water. After addition of 168.4 g of ammonium sulfate and 10.4 g of sodium sulfate, oxygen was removed by bubbling nitrogen gas, and 30 mg of potassium persulfate was added to thereby initiate the polymerization with stirring. With the progress of the polymerization, the viscosity of the reaction system increased until stirring became impossible and the reaction system became a lump.

Comparative Example 4

The polymerization procedure of Example 6 was followed except that sodium acrylate was used in an amount exceeding 40 mole percent. Thus, 13.5 g of acrylamide, 26.5 g of sodium acrylate and 20.0 g of PVP (Mw=10,000) were dissolved in 200.6 g of pure water. After addition of 132.6 g of ammonium sulfate and 6.8 g of sodium sulfate, oxygen was removed by bubbling nitrogen gas, and 30 mg of potassium persulfate was added to thereby initiate the polymerization with stirring. With the progress of the polymerization, the viscosity of the reaction system increased until stirring became impossible and the reaction system became a lump.

INDUSTRIAL APPLICAPABILITY

The present invention is a novel method of producing an acrylic amide-based polymer dispersion in an aqueous inorganic salt solution, and the dispersibility, in water, of the polymer obtained is excellent, so that a highly concentrated aqueous dispersion rich in fluidity can be obtained. They can well retain their characteristics for a prolonged period of time. In addition, the method has other features as follows:

1. Preferred from the environmental protection viewpoint, since no organic solvent is used;

2. Economically excellent owing to high concentration, which is obtainable, hence reduced cost of transportation;

3. Conducive to very good processability since the product, which is a dispersion with fine particles dispersed therein, upon dilution with water, readily undergo swelling and dissolution of the polymers contained therein, giving an aqueous acrylamide-based polymer solution.

What is claimed is:

1. A method of producing acrylic amide-based polymer dispersions which comprises polymerizing a water-soluble monomer composition containing an acrylic amide monomer in an aqueous solution of an inorganic salt in the presence of a homopolymer of vinylpyrrolidone and/or a copolymer of vinylpyrrolidone and another monomer, wherein the inorganic salt is present in an effective concentration for precipitation of the resulting polymer.

2. The method according to claim 1, wherein the inorganic salt is an ammonium salt of an inorganic acid.

3. The method according to claim 1, wherein the inorganic salt is an alkali metal salt of an inorganic acid.

4. The method according to claim 1, wherein the water-soluble monomer composition containing an acrylic amide monomer is acrylamide.

5. The method according to claim 1, wherein the water-soluble monomer composition containing an acrylic amide monomer is a mixture of acrylamide and sodium acrylate.

6. The method according to claim 5, wherein the content of sodium acrylate is not more than 40 mole percent based on the total amount of acrylamide and sodium acrylate.

7. The method according to claim 1, wherein the amount of the water-soluble monomer composition containing an acrylic amide monomer is 1 to 70% by weight relative to the total amount of the inorganic salt, the homopolymer of vinylpyrrolidone and/or the copolymer of vinylpyrrolidone and another monomer, and the water-soluble monomer composition containing an acrylic amide monomer.

8. The method according to claim 1, wherein the amount of the homopolymer of vinylpyrrolidone and/or the copolymer of vinylpyrrolidone and another monomer is 0.1 to 100 parts by weight per 100 parts by weight of the water-soluble monomer composition containing an acrylic amide monomer.

9. The method of claim 1 wherein the concentration of the inorganic salt is kept at saturation.

10. The method of claim 1 wherein the concentration of the inorganic salt is about 34.8% to about 41.4% by weight.

* * * * *